(12) United States Patent
Calandruccio

(10) Patent No.: US 12,358,357 B2
(45) Date of Patent: *Jul. 15, 2025

(54) UNIVERSAL ELECTRIC CONVERSION PROCESS FOR INTERNAL COMBUSTION VEHICLES

(71) Applicant: Current EV Motors, LLC, Austin, TX (US)

(72) Inventor: Rocco West Calandruccio, Austin, TX (US)

(73) Assignee: Current EV Motors, LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/739,977

(22) Filed: Jun. 11, 2024

(65) Prior Publication Data

US 2024/0326569 A1  Oct. 3, 2024

Related U.S. Application Data

(63) Continuation of application No. 18/333,909, filed on Jun. 13, 2023, now Pat. No. 12,011,984, which is a continuation of application No. 17/734,727, filed on May 2, 2022, now Pat. No. 11,712,957, which is a continuation of application No. 17/554,807, filed on Dec. 17, 2021, now Pat. No. 11,351,850.

(60) Provisional application No. 63/127,888, filed on Dec. 18, 2020.

(51) Int. Cl.
| | |
|---|---|
| *B60K 1/02* | (2006.01) |
| *B60K 1/04* | (2019.01) |
| *B60K 17/16* | (2006.01) |
| *B60K 1/00* | (2006.01) |

(52) U.S. Cl.
CPC .............. *B60K 1/02* (2013.01); *B60K 1/04* (2013.01); *B60K 17/16* (2013.01); *B60K 2001/001* (2013.01)

(58) Field of Classification Search
CPC . B60K 1/02; B60K 1/04; B60K 17/16; B60K 2001/001
See application file for complete search history.

(56) References Cited

U.S. PATENT DOCUMENTS

| | | |
|---|---|---|
| 6,220,380 B1 | 4/2001 | Mita et al. |
| 6,953,408 B2 | 10/2005 | Thompson |
| 8,011,461 B2 | 9/2011 | Rodriguez et al. |

(Continued)

FOREIGN PATENT DOCUMENTS

| | | |
|---|---|---|
| JP | 2018176798 A | 11/2018 |
| KR | 20200011712 A | 2/2020 |

OTHER PUBLICATIONS

International Search Report and Written Opinion (ISA/WO/KR) for International Application No. PCT/US2021/064053, report mail date Apr. 18, 2022; pp. 1-11.

*Primary Examiner* — Jason D Shanske
*Assistant Examiner* — James J Triggs
(74) *Attorney, Agent, or Firm* — Bracewell LLP

(57) ABSTRACT

Electric vehicle conversion kits for IC vehicles and converted electric vehicles. An electric vehicle conversion kit may include an electric motor directly coupled to an axle. Another electric vehicle conversion kit may include an electric motor mechanically coupled to an axle via a driveshaft. Another electric vehicle conversion kit may include an electric motor coupled to a transfer case.

19 Claims, 12 Drawing Sheets

(56) References Cited

U.S. PATENT DOCUMENTS

| | | |
|---|---|---|
| 8,376,068 B2 | 2/2013 | Vargas |
| 10,183,698 B2 | 1/2019 | Ta et al. |
| 10,807,466 B1 | 10/2020 | Haka et al. |
| 10,821,853 B2 | 11/2020 | Healy et al. |
| 11,247,548 B2 | 2/2022 | Devreese et al. |
| 11,351,850 B1 * | 6/2022 | Calandruccio ........... B60K 1/00 |
| 2009/0166106 A1 | 7/2009 | Batdorf |
| 2015/0079454 A1 | 3/2015 | Maguire et al. |
| 2019/0263449 A1 | 8/2019 | Ta et al. |
| 2020/0108706 A1 | 4/2020 | Devreese et al. |

* cited by examiner

UNIVERSAL ELECTRIC CONVERSION PROCESS FOR INTERNAL COMBUSTION VEHICLES

CROSS-REFERENCE TO RELATED APPLICATIONS

This application is a continuation of and claims priority from U.S. Nonprovisional application Ser. No. 18/333,909 filed Jun. 13, 2023, and titled "UNIVERSAL ELECTRIC CONVERSION KIT FOR INTERNAL COMBUSTION VEHICLES, which is a continuation of and claims priority from U.S. Nonprovisional application Ser. No. 17/734,727, now U.S. Pat. No. 11,712,957, filed May 2, 2022, and titled "ELECTRIC VEHICLE WITH TRANSFER CASE, which is continuation of and claims priority from U.S. Nonprovisional application Ser. No. 17/554,807, now U.S. Pat. No. 11,351,850, filed Dec. 17, 2021, and titled "UNIVERSAL ELECTRIC CONVERSION KIT FOR INTERNAL COMBUSTION VEHICLES, which claims priority from U.S. Provisional Application No. 63/127,888 filed Dec. 18, 2020, and titled "UNIVERSAL ELECTRIC CONVERSION KIT FOR INTERNAL COMBUSTION VEHICLES." For purposes of United States patent practice, this application incorporates the contents of the Provisional Application by reference in its entirety.

BACKGROUND

Field of the Disclosure

The present disclosure generally relates to electric vehicles (EVs). More specifically, embodiments of the disclosure relate to the conversion of an internal combustion (IC) vehicle to one which is powered by one or more electric motors and batteries (that is, an electric vehicle (EV)).

Description of the Related Art

Vehicles may be powered by different sources, such as internal combustion engines using gasoline, diesel, or natural gas, electric motors and batteries, or combinations of these sources. The majority of vehicles sold and used are IC vehicles having an internal combustion engine (ICE) and a fuel tank that stores a hydrocarbon-based fuel, such as gasoline. As of 2021, an estimated 1 billion IC vehicles or more are actively in use around the world. This number does not include other IC vehicles which are no longer operable due to inoperable motors, transmissions, or other components. Such components may be too expensive to justify repair or may require parts that are no longer available. Many of these vehicles, some of which are considered by collectors or the market as "classic" vehicles, may still be functional except for the inoperable motor, transmission, or both. However, restoring these vehicles to be fully functional, let alone suitable for use on the roads, may be costly, time-consuming, and difficult.

SUMMARY

In some instances, a vehicle owner may desire to convert a usable or inoperable IC vehicle to an electric vehicle (EV). A large majority of these conversions are "bespoke" conversions requiring a complete restoration and reconfiguration of the vehicle from the ground up. The conversion process may be extremely time intensive, may require specialty skills, and is typically very expensive.

The conversion of an IC vehicle to an EV (referred to herein as an "electric conversion" or "EV conversion") may involve removing the motor, fuel tank, gas lines, exhaust system, radiator, power steering system, air conditioning system, heater system, as well as all associated accessories, electronics, and switches inside the cabin of the vehicle. Once this is complete, the location for the electric motor, batteries, and associated power and drive components may be determined. The operation of the power steering, heater, air conditioning system and all motor accessories may also be determined, depending on the particular vehicle. Finally, a vehicle computer, wiring harness, and all associated electronics may be obtained, mounted, finished, and tested.

Due to the large volumetric size of an ICE and the requisite engine compartment (also referred to as an "engine bay"), existing EV conversions typically mount an electric motor in the engine compartment for the internal combustion engine and connect to the existing transmission. However, retaining the existing transmission may produce systemic degradations in efficiency of the EV powertrain. Moreover, uniquely shaped battery boxes must be created to house batteries in multiple places around an IC vehicle. These battery boxes are typically installed in difficult to access areas which may compromise the stability of the vehicle, eliminate room inside the cabin, or result in other undesirable qualities. Moreover, because such battery boxes are tightly engineered, once installed the batteries are very difficult to remove or replace. Consequently, due to the rapid development of battery technology, typical IC conversions may be developed around current battery technology that may be outdated within a few months to a year.

In view of the above difficulties, the market viability of electric vehicle conversions are very limited. The difficulty and expense of such conversions limit them to specialty shops and customers who own unique, valuable, vehicles who are willing to spend the money and take the time to have the conversion complete to their specifications. Consequently, electric conversions of IC vehicles remain a very small part of the world-wide transportation solution.

Embodiments of the disclosure include electric vehicle conversion kits for IC vehicles, and converted electric vehicles. Embodiments of the disclosure may integrate the axle and motor together as a single unit. In some embodiments, the motor and axle may be directly coupled to each other. In some embodiments, the motor and axle may be mechanically coupled via a shaft (such as a "driveshaft"). In some embodiments, an electric motor may be directly coupled to a transfer case that divides power between the front and rear of a vehicle. Advantageously, such embodiments may be produced at volume and may be easily mounted under the vehicle to existing mounting points, thus significantly driving down the cost of the conversion.

Embodiments of the disclosure further include improved placement and installation of batteries for an electric vehicle. Embodiments of the disclosure may eliminate the IC motor, the transmission, exhaust system, and fuel tank(s) (for example, gas tanks), thus providing the engine compartment, fuel tank area, and the entire underside of a vehicle as free space. By way of example, in some embodiments one or more batteries or motors may be located between the frame rails of a vehicle. Such embodiments may locate the batteries or motors at a position at or near the center of gravity between the front and rear of the vehicle. Moreover, in such embodiments the batteries are located outside of the cabin of the vehicle and do not impede on cabin space or create unnecessary manufacturing complications. Further embodiments of the disclosure provide allows for easy "upgrades" (that is, removal and installation) of batteries, motors, or both from a single position under the vehicle (as opposed to multiple locations inside and outside of the vehicle for example). In such embodiments, an underbelly plate, the motors, or both that may be easily removed, serviced, and installed, without damaging other parts of the vehicle.

Embodiments of the disclosure may include the following non-exhaustive list of components: a tray (for example, formed from aluminum sheet metal that has been bent, cut machined, molded, stamped, or any combination thereof, or formed from welded, stamped, or bent steel); An E-axle that may include an electric motor and axle housing and, in some embodiments, an adapter plate (for example, machined from aluminum), custom gearing (for example, machined from steel), custom bearings (for example, machined from steel), or any combination thereof, and a housing (formed from plate steel) partially or fully enclosing the electric motor and adapter plate; a driveshaft with double cardan and universal joints; a wiring harness that includes specific connections of wiring to positions of components of the vehicle; a vehicle computer (which may be referred to or include a "central processing unit (CPU)"); and batteries (that is, one or more batteries). In some embodiments, the batteries may be designed or sourced based on the volume of space in an engine compartment or under a vehicle. For example, in some embodiments some of the batteries of a battery pack may be flat and other batteries of the battery pack may be rounded, such as to optimize the space within a transmission tunnel, engine compartment, or fuel tank area.

In one embodiment, a conversion kit for converting an internal combustion engine (ICE) vehicle to an electric vehicle is provided. The conversion kit includes an electric motor directly coupled to an axle of the vehicle and adapted to power rotation of the axle, an adapter plate coupled to the electric motor and the axle, and an electric motor plate coupled to the electric motor and the adapter plate and positioned between the electric motor and a surface of the ground. The conversion kit also includes a tray coupled to a frame of the vehicle and positioned between the frame and the surface of the ground, the tray having a top side and a bottom side opposite the top side, and a battery coupled to the top side of the tray and electrically connected to the electric motor, such that the battery is located between at least two frame rails of the frame.

In some embodiments, the axle is a front axle located at the front of the vehicle, the electric motor is a first electric motor, the adapter plate is a first adapter plate, and the electric motor plate is a first electric motor plate. In such embodiments, the conversion kit includes a second electric motor directly coupled a rear axle of the vehicle and adapted to power rotation of the rear axle, the rear axle located at the rear of the vehicle, a second adapter plate coupled to the second electric motor and the rear axle, and a second electric motor plate coupled to the second electric motor and the second adapter plate and positioned between the second electric motor and the surface of the ground. In some embodiments, the tray is a moveable access panel. In some embodiments, the adapter plate is coupled to the electric motor and the axle via an axle housing or center differential. In some embodiments, the adapter plate includes a reduction gear. In some embodiments, the axle is a solid axle. In some embodiments, a portion of the battery is located in a transmission tunnel of the vehicle.

In another embodiment, a conversion kit for converting an internal combustion engine (ICE) vehicle to an electric vehicle. The conversion kit includes a tray coupled to a frame of the vehicle and positioned between the frame and the surface of the ground, the tray having a top side and a bottom side opposite the top side, a coupling plate configured to couple an electric motor to the top side of the tray, and the electric motor. The electric motor is located between at least two frame rails of the frame and between a first axle and second axle of the vehicle, and the electric motor is coupled to an axle via a driveshaft and configured to power rotation of the first axle. The conversion kit also includes a battery coupled to the top side of the tray and electrically connected to the electric motor, such that the battery is located between the at least two frame rails of the frame.

In some embodiments, the first axle is a front axle located at the front of the vehicle, the electric motor is a first electric motor, the driveshaft comprises a first driveshaft, and the coupling plate is a first coupling plate. In such embodiments, the conversion kit includes a second coupling plate configured to couple a second electric motor to the top side of the tray and the second electric motor. The second electric motor is located between the at least two frame rails of the frame, and the second electric motor is coupled to a rear axle via a second driveshaft and configured to power rotation of the rear axle. In some embodiments, the tray is a moveable access panel. In some embodiments, the driveshaft is coupled to the axle via an axle housing or center differential. In some embodiments, the axle is a solid axle.

In another embodiment, a conversion kit for converting an internal combustion engine (ICE) vehicle to an electric vehicle is provided. The conversion kit includes a tray coupled to the frame of the vehicle and positioned between the frame and the surface of the ground, the tray having a top side and a bottom side opposite the top side, and an electric motor coupled to a transfer case of the vehicle via an adapter plate. The transfer case is coupled to an axle of the vehicle via a driveshaft, and the electric motor is configured to power rotation of an axle of the vehicle and is located between at least two frame rails of the frame. The conversion kit also includes the adapter plate and a battery coupled to the top side of the tray and electrically connected to the electric motor, such that the battery is located between the at least two frame rails of the frame.

In some embodiments, the axle is a front axle located at the front of the vehicle and the driveshaft is a first driveshaft, such that the transfer case is coupled to a rear axle of the vehicle via a second driveshaft and the electric motor is configured to power rotation of the rear axle of the vehicle. In some embodiments, the tray is a moveable access panel. In some embodiments, the driveshaft is coupled to the axle via an axle housing or center differential. In some embodiments, the adapter plate couples an output shaft of the electric motor to an input shaft of the transfer case. In some embodiments, the adapter plate is a shaft that couples the output shaft of the electric motor to the input shaft of the transfer case. In some embodiments, the transfer case is coupled to the tray.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used in the disclosure, the term "axle" refers to any different configuration of an axle and may include a solid axle, an axle paired to constant velocity (CV) shafts, an independent suspension, or any other axle configuration.

An electric motor as referred to herein may include a permanent magnet electric motor, an alternating current (AC) induction motor, axial flux motor, or other suitable motors. In embodiments having two electric motors, the electric motors may be the same type of motor or different types of motors.

As used herein, the term "batteries" may refer to a single battery or battery cell, or multiple batteries or batteries. Such batteries may include pouch cells, cylindrical cells, or prismatic cells.

Electric Vehicle Conversion Kit with Electric Motor Directly Coupled to Axle

Figure 1:
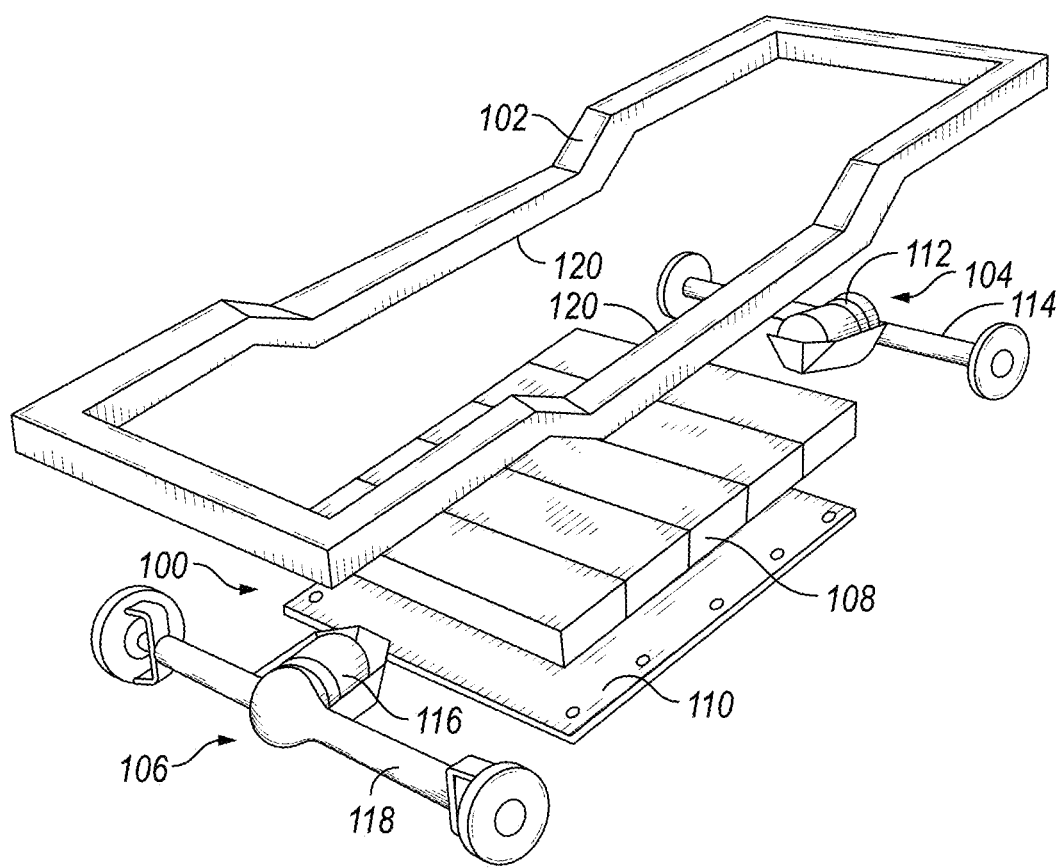
FIG. 1 is a schematic diagram of an electric vehicle conversion kit for an IC vehicle in which an electric motor is directly coupled to an axle in accordance with an embodiment of the disclosure.

Embodiments of the disclosure may include an electric motor directly coupled to an axle (such embodiments are referred to herein as having a "married" e-axle). FIG. 1 is a schematic diagram of an electric vehicle conversion kit 100 for an IC vehicle (not shown) and having an electric motor directly coupled to an axle in accordance with an embodiment of the disclosure. FIG. 1 also depicts an example frame (or chassis) 102 for reference. The electric vehicle conversion kit 100 includes a rear e-axle 104, a front e-axle 106, batteries 108, and a tray 110. It should be appreciated that the possible fasteners and other elements for attaching these components to different kinds of vehicles is intentionally omitted for clarity.

The frame (or chassis) 102 may be representative of the frame or chassis of an IC vehicle. As will be appreciated, the frame (or chassis) 102 is a generalization of the look of common vehicle frames in the ¾ perspective view depicted in FIG. 1.

The rear e-axle 104 may be used in embodiments having four wheel drive and rear wheel drive configurations. Such embodiments may include a solid axle, an independent rear suspension, or any other type of rear suspension geometry. The rear e-axle 104 may include an electric motor 112 and axle 114. The electric motor 112 may be mounted inline or transverse with respect to the axle 114. The rear e-axle 104 may be usable across multiple vehicle platforms without extensive modification. For example, the modifications may be mounting points for the suspension, lengths of axle shafts, gear ratios, and differences for types of brakes or bolt patterns for wheels.

The front e-axle 106 may be used in embodiments having four wheel drive and front wheel drive configurations. Such embodiments may include a solid axle, an independent front suspension, or any other type of rear suspension geometry. The front e-axle 106 may include an electric motor 116 and axle 118. The electric motor 116 may be mounted inline or transverse with respect to the axle 118. The front e-axle 104 may be usable across multiple vehicle platforms without extensive modification. For example, the modifications may be mounting points for the suspension, lengths of axle shafts, gear ratios, and differences for types of brakes or bolt patterns for wheels.

As shown in FIG. 1, in some embodiments the batteries 108 may be located in the between the frame rails (or chassis rails) 120. The batteries 108 may be secured via the tray 110. In some embodiments, the tray 110 may include or be attached to a skid plate. The location of the batteries 108 may contribute to chassis rigidity and provide for easier access for servicing. As will be appreciated, the batteries 108 shown in FIG. 1 are a generalized representation and not meant to indicate a specific number of batteries, preferred orientation, or shape. Moreover, embodiments having the batteries 108 may provide the engine compartment and gas tank area for storage. In some embodiments, additional batteries may be installed in the engine compartment, gas tank area, or both, for increased power, range, or combination thereof. Embodiments of the disclosure may include a battery cooling system to cool the batteries 108. Such systems may use various cooling technologies known in the art, such as air cooling, liquid cooling, fins, or other cooling technologies.

The electric vehicle conversion kit 100 may also include a tray 110. The tray 110 may be configured for attachment to the specific vehicle being converted. For example, the tray 110 may be coupled to the frame 102. The tray 110 may serve the function of a skid plate for protection and a mounting plate for the batteries 108. In some embodiments, plate 100 may protect the batteries 108 from debris or obstacles under the vehicle. In some embodiments, the tray 110 may provide a mounting plate for the batteries 108 and may provide an access panel to the power source (that is, batteries 108) of the vehicle. The tray 110 may be attached via bolts, screws, hinges, or other suitable fasteners or combination thereof. The tray 100 may be a single piece or may include multiple pieces. In some embodiments, the tray 110 may be generally rectangular-shaped. In other embodiments, the tray 110 may have a different shape. In some embodiments, the tray 110 may have a raised rim on one side, two sides, or more than two sides. For example, in such embodiments the raised rim may house fasteners or other components. In other embodiments, the tray 110 may not have a raised rim.

Figure 2A:
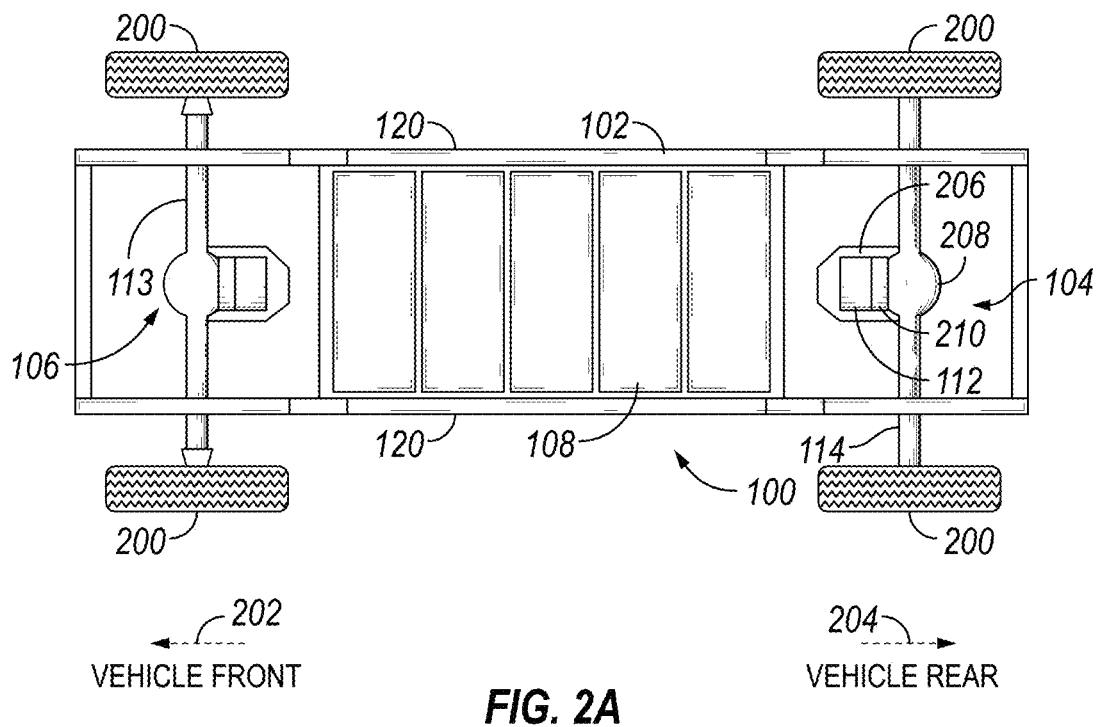
FIGS. 2A and 2B are schematic diagrams of the electric vehicle conversion kit of FIG. 1 in accordance with an embodiment of the disclosure.
Figure 2B:
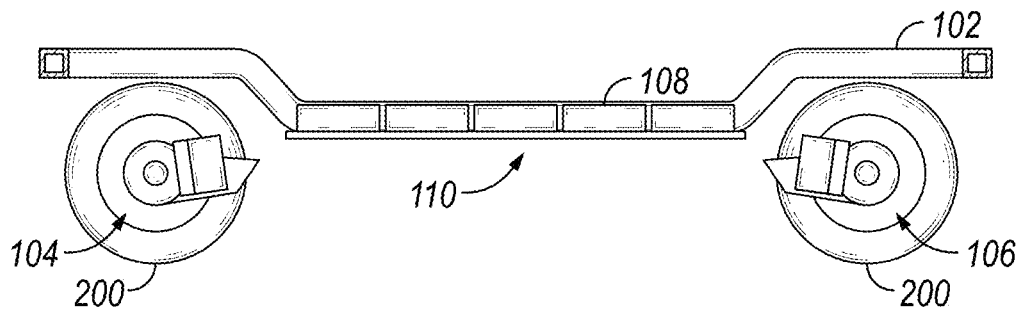

FIGS. 2A and 2B are a top schematic view and side schematic view respectively of the electric vehicle conversion kit 100 of FIG. 1 in accordance with an embodiment of the disclosure. FIGS. 2A and 2B depict the frame (or chassis) 102 and associated rails 120 of the vehicle and the rear e-axle 104, the front e-axle 106, and the batteries 108. The tray 110 is shown in FIG. 2B. The tires 200 of the vehicle are depicted for reference. Arrow 202 indicates the direction to the front of the vehicle, and arrow 204 indicates the direction to the rear of the vehicle. As shown in FIGS. 2A and 2B, the electric vehicle conversion kit 100 is relatively symmetrical between the front and rear of the vehicle and between the sides of the vehicle. As also shown in these figures, the electric vehicle conversion kit 100 may have a low profile and may be positioned for optimal weight distribution.

FIGS. 2A and 2B further illustrate the position of the batteries 108 between the frame (or chassis) rails 120. In some embodiments, the batteries 108 may be retained between the frame (or chassis) rails 120 via the tray 110. FIGS. 2A and 2B also more clearly depict the accessibility of the rear e-axle 104 and front rear e-axle 106 and the lowered center of gravity provided by the position of these components (as compared to an ICE mounted in an engine compartment and a transmission mounted in a transmission tunnel). FIG. 2A also depicts an electric motor plate 206, an axle housing (or center differential) 208, and an adapter plate 210. The electric motor plate 206 may serve the function of a skid plate for protection of electronic and adapter components for the electric motor and adapter plate 210. In some embodiments, the electric motor plate 206 may provide a mounting point for suspension components, electronics, or both. The axle housing (or center differential) 208 may a suitable component for a solid axle or an independent suspension configuration with CV shafts, or any other axle design which distributes power to two wheels from a central or offset axle. As will be appreciated, the shape of the electric motor plate 206 illustrated in FIG. 2A is merely one embodiment and other embodiments may have different shapes, sizes, or both. The adapter plate 210 may connect the electric motor 112 to the axle housing (or center differential) 208. In some embodiments, the adapter plate 210 may connect the electric motor 112 to a third member. The adapter plate 210 may also house reduction gears, bearings, or any associated parts, mechanical, electrical, or otherwise which allows the electric motor to adapt to the axle housing (or center differential) 208. As shown in FIG. 2A, in some embodiments, the electric motor 112, the electric motor plate 206, and the adapter plate 210 may be mounted transversely with respect to the axle. In other embodiments, the electric motor 112, the electric motor plate 206, and the adapter plate 210 may be mounted in-line with respect to the axle.

FIG. 2A also depicts the front e-axle 106 located at the front of the frame (or chassis) 202. The components of the front e-axle 106 are discussed below with reference to FIG. 4.

Figure 3A:
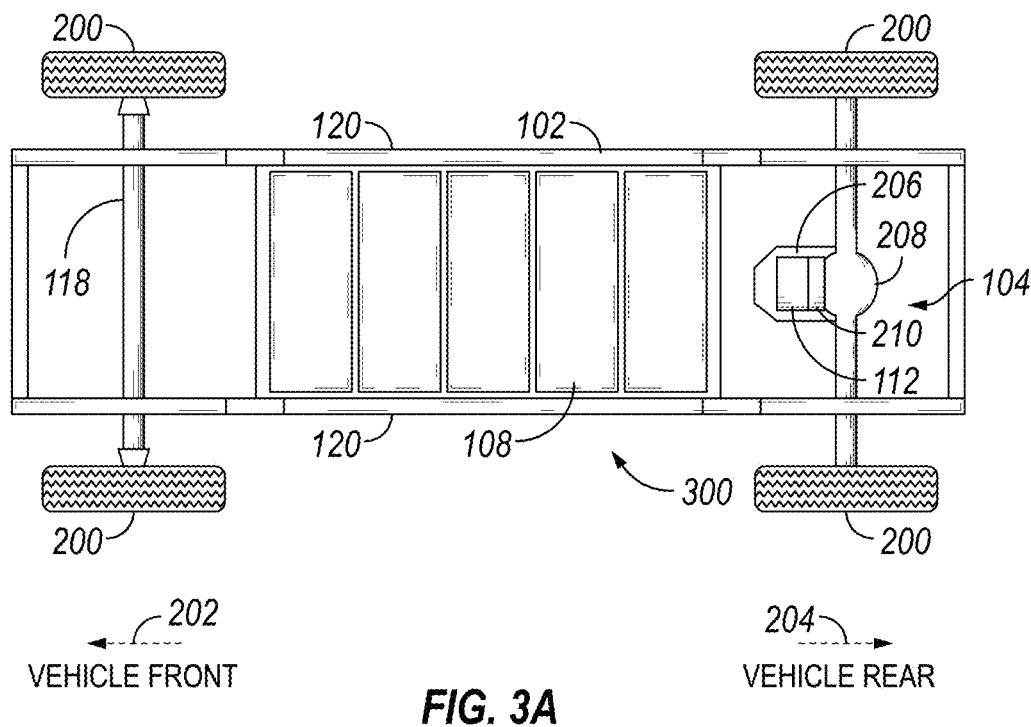
FIGS. 3A and 3B are schematic diagrams of the electric vehicle conversion kit of FIG. 1 in a rear wheel drive configuration in accordance with an embodiment of the disclosure.
Figure 3B:
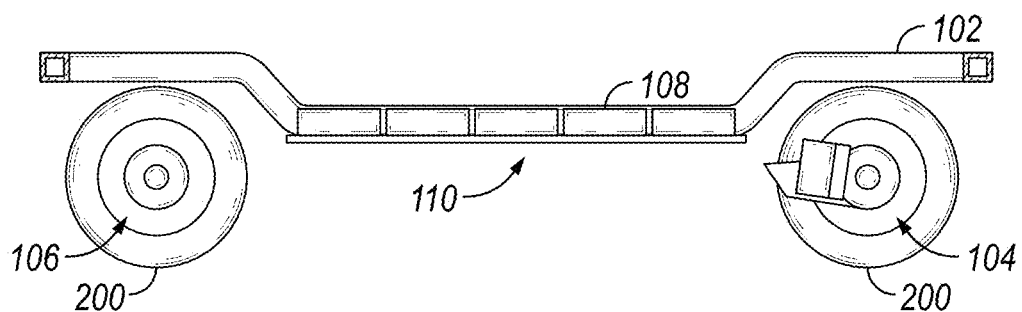

FIGS. 3A and 3B are a top schematic view and side schematic view respectively of an electric vehicle conversion kit 300 (adapted from the kit 100) in a rear wheel drive configuration in accordance with an embodiment of the disclosure. FIGS. 3A and 3B depict the frame (or chassis) 102 and associated rails 120 of the vehicle, the rear e-axle 104, and the batteries 108. The tray 110 is shown in FIG. 2B. The tires 306 and arrows 308 and 310 are also shown for reference. As shown in FIGS. 3A and 3B, the electric vehicle conversion kit 300 may have a low profile and may be positioned for optimal weight distribution.

FIGS. 3A and 3B further illustrate the position of the batteries 108 between (and in some embodiments below) the frame (or chassis) rails 120. In some embodiments, the batteries 108 may be securely retained between the frame (or chassis) rails 120 via a tray (for example, plate 110). FIGS. 3A and 3B also more clearly depict the accessibility of the rear e-axle 104 and the lowered center of gravity provided by the position of these components (as compared to an ICE mounted in an engine compartment and a transmission mounted in a transmission tunnel). The rear axle 104 includes the electric motor plate 206, the axle housing (or center differential) 208, and the adapter plate 210, as previously described.

Figure 4A:
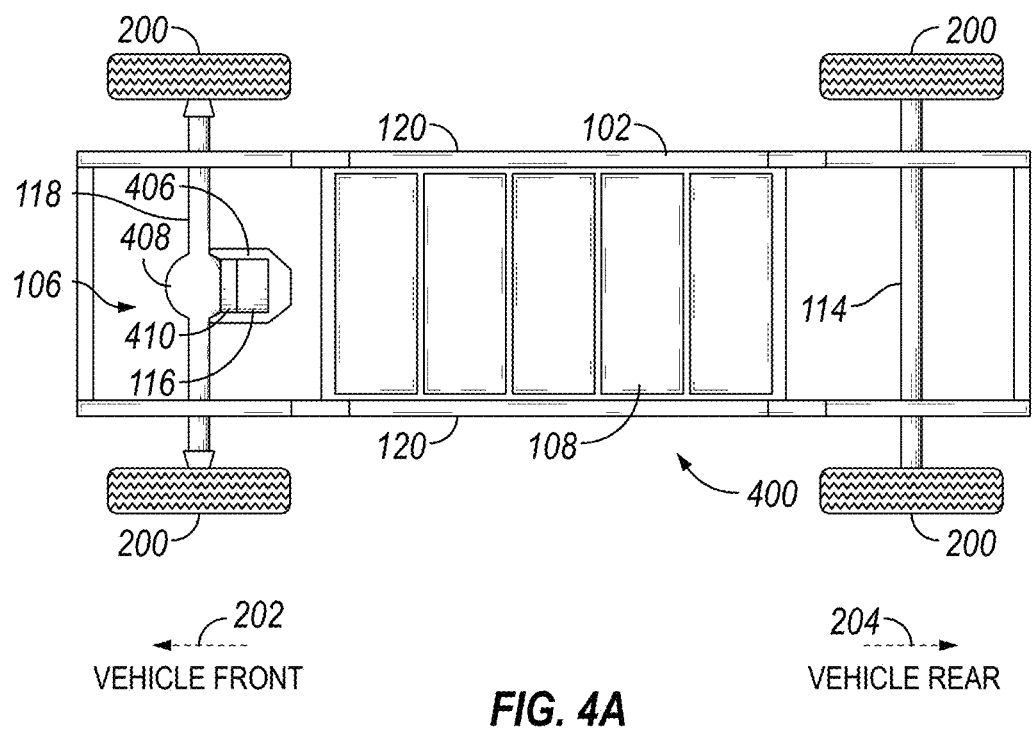
FIGS. 4A and 4B are schematic diagrams of the electric vehicle conversion kit of FIG. 1 in a front wheel drive configuration in accordance with an embodiment of the disclosure.
Figure 4B:
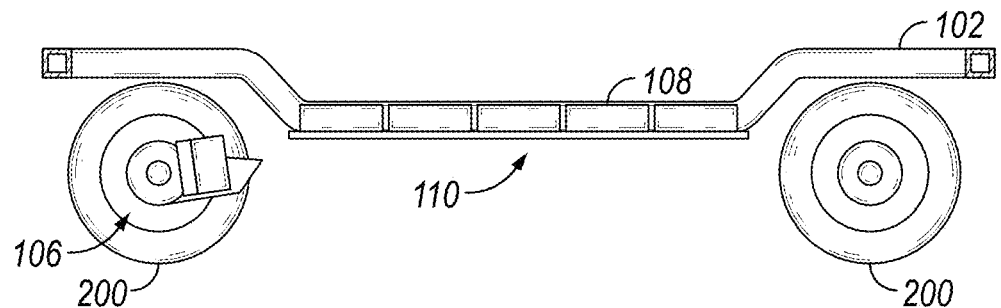

FIGS. 4A and 4B are a top schematic view and side schematic view respectively of an electric vehicle conversion kit 400 (adapted from the kit 100) in a front wheel drive configuration in accordance with an embodiment of the disclosure. FIGS. 4A and 4B depict the frame (or chassis) 102 and associated rails 120 of the vehicle, the front e-axle 106, and the batteries 108. The tray 110 is depicted in FIG. 4B. The tires 306 and arrows 308 and 310 are also shown for reference. As shown in FIGS. 4A and 4B, the electric vehicle conversion kit 400 in a front wheel drive configuration may have a low profile and may be positioned for optimal weight distribution.

FIGS. 4A and 4B further illustrate the position of the batteries 108 between the frame (or chassis) rails 120. In some embodiments, the batteries 108 may be securely retained between the frame (or chassis) rails 120 via a tray (for example, plate 110). FIGS. 4A and 4B also more clearly depict the accessibility of the front e-axle 106 and the lowered center of gravity provided by the position of these components (as compared to an ICE mounted in an engine compartment and a transmission mounted in a transmission tunnel).

FIG. 4A also depicts an electric motor plate 406, an axle housing (or center differential) 408, and an adapter plate 410. The electric motor plate 406 may serve the function of a skid plate for protection of electronic and adapter components for the electric motor and adapter plate 410. In some embodiments, the electric motor plate 406 may provide a mounting point for suspension components, electronics, or both. The axle housing (or center differential) 408 may a suitable component for a solid axle or an independent suspension configuration with CV shafts, or any other axle design which distributes power to two wheels from a central or offset axle. As will be appreciated, the shape of the electric motor plate 406 illustrated in FIG. 4A is merely one embodiment and other embodiments may have different shapes, sizes, or both. The adapter plate 410 may connect the electric motor 116 to the axle housing (or center differential) 408. In some embodiments, the adapter plate 410 may connect the electric motor 116 to a third member. The adapter plate 410 may also house reduction gears, bearings, or any associated parts, mechanical, electrical, or otherwise which allows the electric motor to adapt to the axle housing (or center differential) 408. As shown in FIG. 4A, in some embodiments, the electric motor 116, the electric motor plate 406, and the adapter plate 410 may be mounted transversely with respect to the axle. In other embodiments, the electric motor 116, the electric motor plate 406, and the adapter plate 410 may be mounted in-line with respect to the axle.

Embodiments of the disclosure further include an electric vehicle having the components illustrated in FIGS. 1-4 and described above. It should be appreciated that in such embodiments the electric vehicle may include other components specific to the particular vehicle, such as a wiring harness, a computer, a power steering system (that may include a power steering adapter to adapt the power steering from hydraulic assist to electrical assist), a heating and air conditioning system (that may include a heating and air conditioning adapter to adapt the heating and air conditioning from mechanical drive to electric power), cabin controllers, switches, dials, and other hardware and software interface elements that enable control and monitoring of the vehicle, and electric components, fuses, relays, and connectors.

Figure 5:
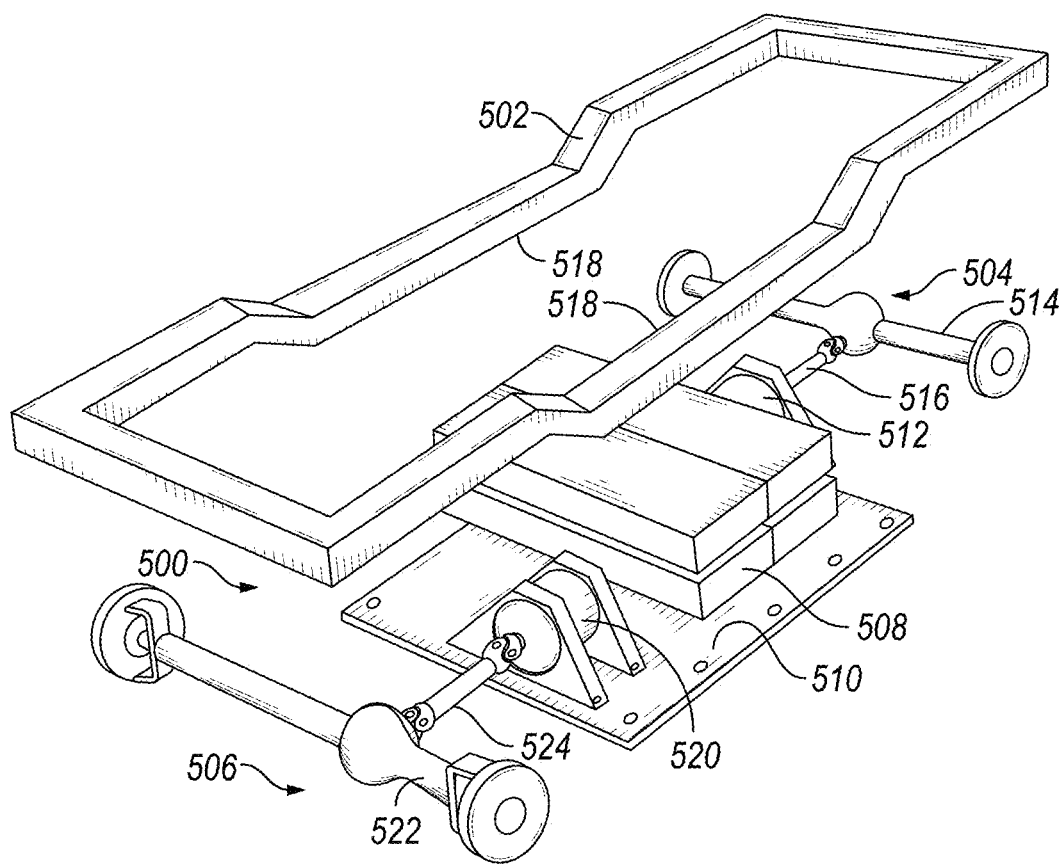
FIG. 5 is a schematic diagram of an electric vehicle conversion kit for an IC vehicle in which an electric motor is coupled to an axle via a driveshaft in accordance with an embodiment of the disclosure.

Electric Vehicle Conversion Kit with Electric Motor Mechanically Coupled to Axle Via a Driveshaft In other embodiments of the disclosure, an electric motor and axle may be mechanically coupled via a component such as a driveshaft (such embodiments are referred to herein as having a "divorced" e-axle"). FIG. 5 is a schematic diagram of an electric vehicle conversion kit 500 for an IC vehicle (not shown) in accordance with another embodiment of the disclosure. FIG. 5 depicts an example frame (or chassis) 502 of a suitable vehicle for reference. The electric vehicle conversion kit 500 includes a rear e-axle 504, a front e-axle 506, batteries 508, and a tray 510. It should be appreciated that the possible fasteners and other elements for attaching these components to different kinds of vehicles is intentionally omitted for clarity.

The frame (or chassis) 502 may be representative of the frame or chassis of an IC vehicle for conversion. As will be appreciated, the frame (or chassis) 502 is a generalization of the look of common vehicle frames in the ¾ perspective view depicted in FIG. 5.

The rear e-axle 504 may be used in embodiments having four wheel drive and rear wheel drive configurations. Such embodiments may include a solid axle or an independent rear suspension. The rear e-axle 504 may include an electric motor 512, an axle 514, and a driveshaft 516. In such embodiments, the electric motor 512 is not directly mounted to or integrated with the axle 514. In some embodiments, the electric motor 512 may be positioned between the frame rails 518. In other embodiments, the electric motor 512 may be positioned at another position under the vehicle. The driveshaft 512 mechanically couples the electric motor 512 to the axle 514. The electric motor 512 may be mounted inline or transverse with respect to the axle 514, with the driveshaft 516 coupled accordingly for inline or transverse operation. The rear e-axle 504 may be usable across multiple vehicle platforms without extensive modification. For example, the modifications may be mounting points for the suspension, lengths of axle shafts, gear ratios, and differences for types of brakes or bolt patterns for wheels.

The front e-axle 506 may be used in embodiments having four wheel drive and rear wheel drive configurations. Such embodiments may include a solid axle or an independent rear suspension. The rear e-axle 506 may include an electric motor 520, an axle 522, and a driveshaft 524. In such embodiments, the electric motor 520 is not mounted to or integrated with the axle 522. In some embodiments, the electric motor 520 may be mounted between the frame rails 518. In other embodiments, the electric motor 520 may be mounted at another position under the vehicle. The driveshaft 524 mechanically couples the electric motor 520 to the axle 522. The electric motor 520 may be mounted inline or transverse with respect to the axle 522, with the driveshaft 524 coupled accordingly for inline or transverse operation. The front e-axle 506 may be usable across multiple vehicle platforms without extensive modification. For example, the modifications may be mounting points for the suspension, lengths of axle shafts, gear ratios, and differences for types of brakes or bolt patterns for wheels.

As shown in FIG. 5, in some embodiments the batteries 508 may be located in the between the frame rails (or chassis rails) 518. The batteries 508 may be secured via the tray 510. In some embodiments, the tray 510 may include or be attached to a skid plate. The location of the batteries 508 may contribute to chassis rigidity and provide for easier access for servicing. As will be appreciated, the batteries 508 shown in FIG. 5 are a generalized representation and not meant to indicate a specific number of batteries, preferred orientation, or shape. For example, in some embodiments the motors 508 may be centrally located between the batteries 508, such that one or more of the batteries 508 are on one side of the motors 512 and 520 and one or more of the batteries 508 are on the other side of the motors 512 and 520.

Moreover, embodiments having the batteries 508 may provide the engine compartment and gas tank area for storage. In some embodiments, additional batteries may be installed in the engine compartment, gas tank area, or both, for increased power, range, or combination thereof. Embodiments of the disclosure may include a battery cooling system to cool the batteries 508. Such systems may use various cooling technologies known in the art, such as air cooling, liquid cooling, fins, or other cooling technologies.

The electric vehicle conversion kit 500 may also include a tray 510. The tray 510 may be configured for secure attachment to the specific vehicle being converted. For example, the tray 510 may be coupled to the frame 502. The tray 510 may serve the function of a skid plate for protection and a mounting plate for the batteries 508 and the motors 512 and 520. In some embodiments, plate 510 may protect the batteries 508 and the motors 512 and 520 from debris or obstacles under the vehicle. In some embodiments, the tray 510 may provide a mounting plate for the batteries 508 and the motors 512 and 520. In some embodiments, the tray 510 may provide an access panel to the power source (that is, batteries 508) and drive system (motors 512 and 520 and respective driveshafts 516 and 524) of the vehicle. The tray 510 may be attached via bolts, screws, hinges, or other suitable fasteners or combination thereof. The tray 510 may be a single piece or may include multiple pieces. In some embodiments, the tray 510 may be generally rectangular-shaped. In other embodiments, the tray 510 may have a different shape. In some embodiments, the tray 510 may have a raised rim on one side, two sides, or more than two sides. For example, in such embodiments the raised rim may house fasteners or other components. In other embodiments, the tray 510 may not have a raised rim.

Figure 6A:
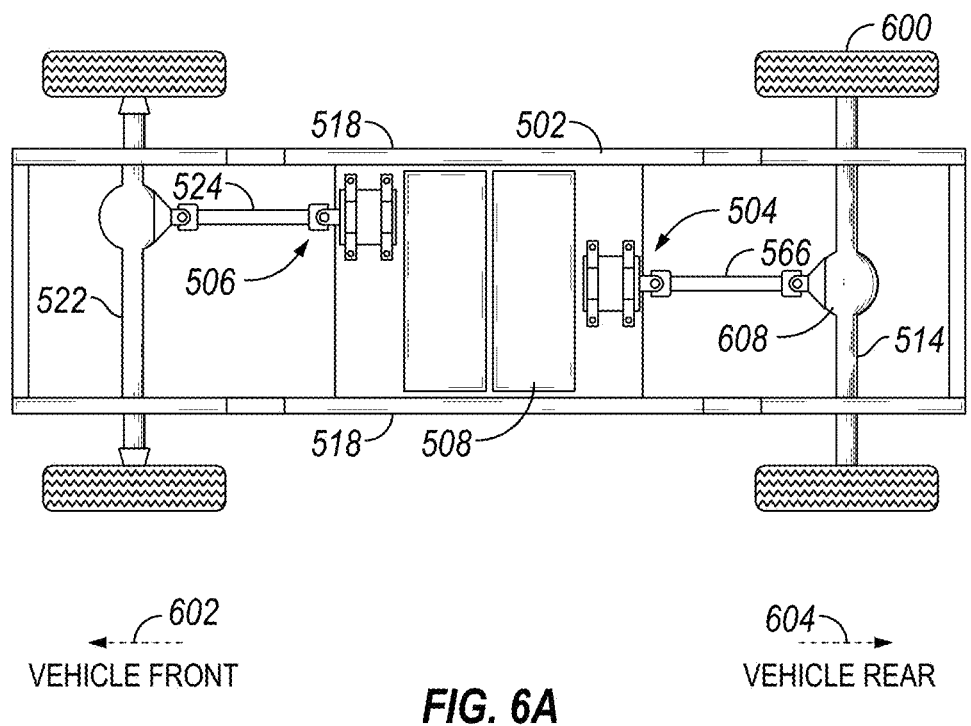
FIGS. 6A and 6B are schematic diagrams of the electric vehicle conversion kit of FIG. 5 in accordance with an embodiment of the disclosure.
Figure 6B:
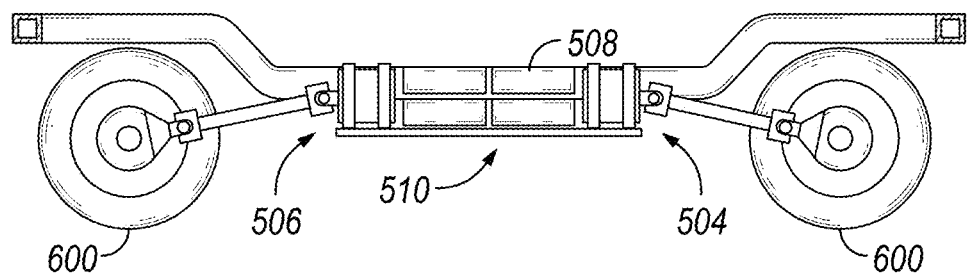

FIGS. 6A and 6B are a top schematic view and side schematic view respectively of the electric vehicle conversion kit 500 of FIG. 5 in accordance with an embodiment of the disclosure. FIGS. 6A and 6B depict the frame (or chassis) 502 and associated rails 518 of the vehicle, the rear e-axle 504, the front e-axle 506, and the batteries 508. The tray 510 is omitted for clarity. The tires 600 of the vehicle are depicted for reference. Arrow 602 indicates the direction to the front of the vehicle, and arrow 604 indicates the direction to the rear of the vehicle. As shown in FIGS. 6A and 6B, the electric vehicle conversion kit 600 is relatively symmetrical between the front and rear of the vehicle and between the sides of the vehicle. As also shown in these figures, the electric vehicle conversion kit 600 may have a low profile and may be positioned for optimal weight distribution due to the position of the batteries 508 and the electric motors 514 and 520 close to the center of the vehicle and lower to the ground (as compared to an ICE powertrain).

FIGS. 6A and 6B further illustrate the position of the batteries 508 and the electric motors 514 and 520 between the frame (or chassis) rails 518. In some embodiments, the batteries 508 and the electric motors 512 and 520 may be securely retained between the frame (or chassis) rails 120 via a tray (for example, plate 510). FIGS. 6A and 6B also more clearly depict the accessibility of the rear e-axle 504 and front rear e-axle 506 and the lowered center of gravity provided by the position of these components (as compared to an ICE mounted in an engine compartment and a transmission mounted in a transmission tunnel).

FIG. 6A also depicts electric motor mounting plates 606 and an axle housing (or center differential) 608. The electric motor mounting plates 606 may mount the electric motor 512 to the tray 510 or another mounting point underneath a vehicle. In some embodiments, one, two, or more mounting plates 606 may be used. The axle housing (or center differential) 608 may a suitable component for a solid axle or an independent suspension configuration with CV shafts, or any other axle design which distributes power to two wheels from a central or offset axle. As will be appreciated, the shape of the electric motor mounting plates 606 illustrated in FIG. 6A are merely one embodiment and other embodiments may have different shapes, sizes, or both. As shown in FIG. 6A, in some embodiments, the electric motor 512, the electric motor mounting plates 606, and the driveshaft 514 may be mounted transversely with respect to the axle. In other embodiments, the electric motor 512 and the electric motor mounting plates 606 may be mounted in-line with respect to the axle.

In other embodiments, the conversion kit 500 may include a single electric motor that powers both driveshafts 516 and 524. In such embodiments, the single electric motor may be centrally located with respect to the frame 502, the tray 510, or the combination thereof. Such embodiments may include a single electric motor mounting plate to couple the single electric motor to the tray 510.

Figure 7A:
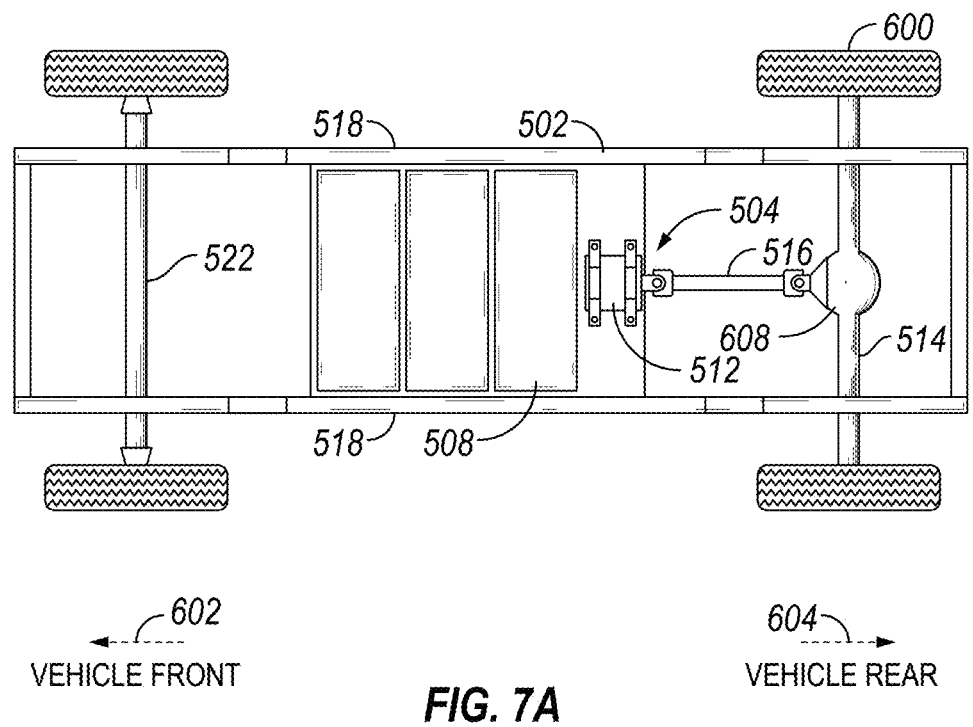
FIGS. 7A and 7B are schematic diagrams of the electric vehicle conversion kit of FIG. 5 in a rear wheel drive configuration in accordance with an embodiment of the disclosure.
Figure 7B:
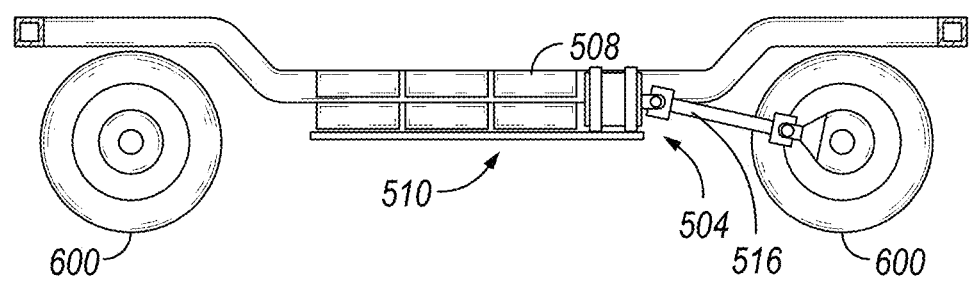

FIGS. 7A and 7B are a top schematic view and side schematic view respectively of an electric vehicle conversion kit 700 (adapted from kit 500) in a rear wheel drive configuration in accordance with an embodiment of the disclosure. FIGS. 7A and 7B depict the frame (or chassis) 502 and associated rails 518, and tires 600 of the vehicle, the rear e-axle 504 and the batteries 508. The tray 510 is shown in FIG. 7B. As shown in FIGS. 7A and 7B, the electric vehicle conversion kit 700 may have a low profile and may be positioned for optimal weight distribution.

FIGS. 7A and 7B further illustrate the position of the batteries 708 and electric motor 512 between the frame (or chassis) rails 504. In some embodiments, the batteries 508 and electric motor 512 may be securely retained between the frame (or chassis) rails 504 via a tray (for example, plate 510). FIGS. 7A and 7B also more clearly depict the accessibility of the rear e-axle 512 and the lowered center of gravity provided by the position of these components of the rear e-axle 512 (as compared to an ICE mounted in an engine compartment and a transmission mounted in a transmission tunnel). The rear e-axle 504 includes the electric motor mounting plates 606, housing (or center differential) 608, and the driveshaft 514, as previously described.

Figure 8A:
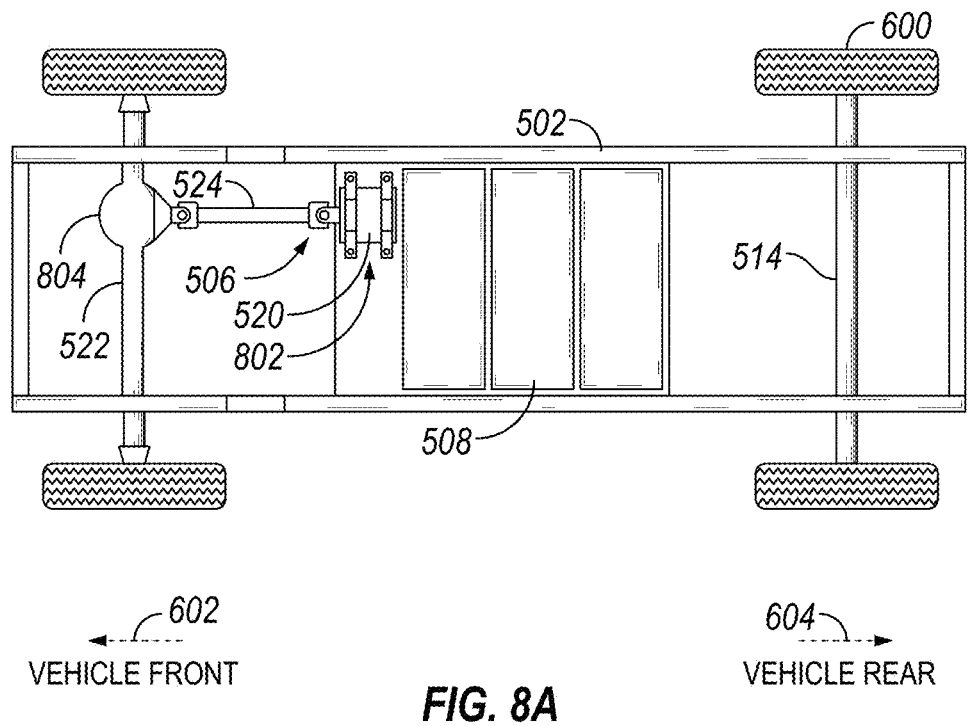
FIGS. 8A and 8B are schematic diagrams of the electric vehicle conversion kit of FIG. 5 in a front wheel drive configuration in accordance with an embodiment of the disclosure.
Figure 8B:
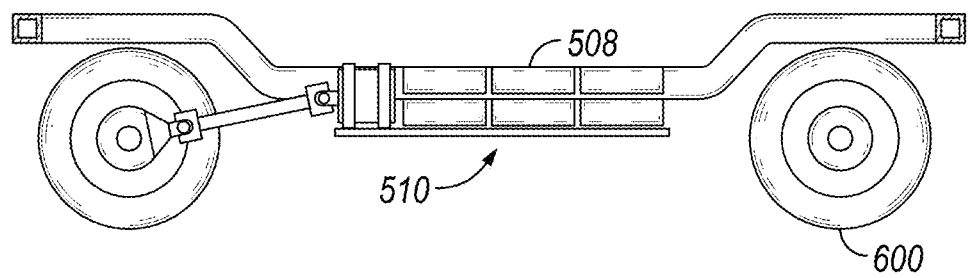

FIGS. 8A and 8B are a top schematic view and side schematic view respectively of an electric vehicle conversion kit 800 (adapted from kit 500) in a front wheel drive configuration in accordance with an embodiment of the disclosure. FIGS. 8A and 8B depict the frame (or chassis) 502 and associated rails 518, and tires 600 of the vehicle, the front e-axle 506, and the batteries 508. The tray 510 is shown in FIG. 8B. As shown in FIGS. 8A and 8B, the electric vehicle conversion kit 800 in a front wheel drive configuration may have a low profile and may be positioned for optimal weight distribution.

FIGS. 8A and 8B further illustrate the position of the batteries 508 and electric motor 520 between the frame (or chassis) rails 518. In some embodiments, the batteries 808 may be securely retained between the frame (or chassis) rails 518 via a tray (for example, plate 510). FIGS. 8A and 8B also more clearly depict the accessibility of the front e-axle 506 and the lowered center of gravity provided by the position of these components (as compared to an ICE mounted in an engine compartment and a transmission mounted in a transmission tunnel).

FIG. 8A also depicts electric motor mounting plates 802 and an axle housing (or center differential) 804. The electric motor mounting plates 810 may mount the electric motor 520 to a tray (for example, similar to plate 510) or another mounting point underneath a vehicle. In some embodiments, one, two, or more mounting plates 810 may be used. The axle housing (or center differential) 812 may a suitable component for a solid axle or an independent suspension configuration with CV shafts, or any other axle design which distributes power to two wheels from a central or offset axle. As will be appreciated, the shape of the electric motor mounting plates 810 illustrated in FIG. 8A are merely one embodiment and other embodiments may have different shapes, sizes, or both. As shown in FIG. 8A, in some embodiments, the electric motor 520, the electric motor mounting plates 810, and the driveshaft 524 may be mounted transversely with respect to the axle. In other embodiments, the electric motor 520 and the electric motor mounting plates 810 may be mounted in-line with respect to the axle. In other embodiments, the front e-axle 806 may omit the driveshaft 524 and may instead include a chain or gear drive that connects directly to the axle 522.

Embodiments of the disclosure further include an electric vehicle having the components illustrated in FIGS. 5-8 and described above. It should be appreciated that in such embodiments the electric vehicle may include other components specific to the particular vehicle, such as a wiring harness, a computer, a power steering system (that may include a power steering adapter to adapt the power steering from hydraulic assist to electrical assist), a heating and air conditioning system (that may include a heating and air conditioning adapter to adapt the heating and air conditioning from mechanical drive to electric power), cabin controllers, switches, dials, and other hardware and software interface elements that enable control and monitoring of the vehicle, and electric components, fuses, relays, and connectors.

Figure 9:
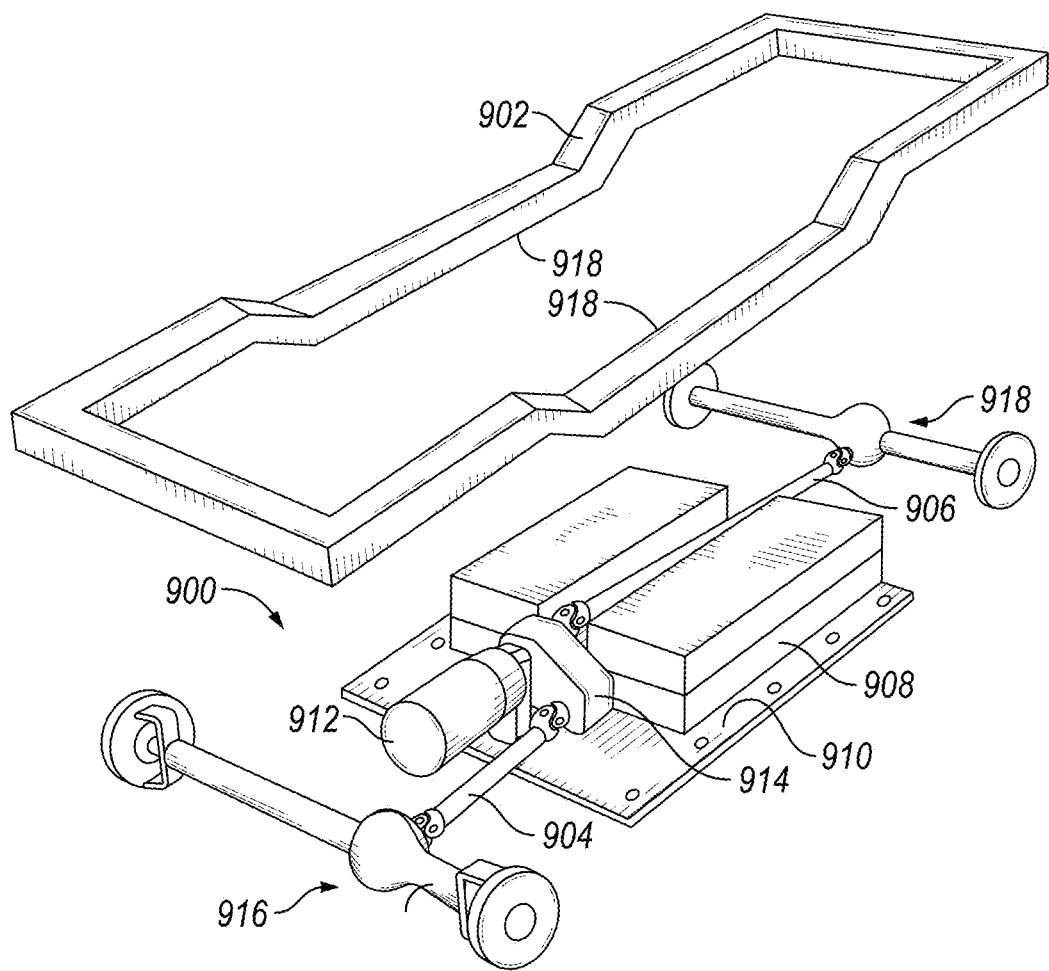
FIG. 9 is a schematic diagram of an electric vehicle conversion kit for an IC vehicle in which an electric motor is coupled a transfer case in accordance with an embodiment of the disclosure.

Electric Vehicle Conversion Kit with Electric Motor Mechanically Coupled to Transfer Case In other embodiments, power for propulsion may be provided directly from a transfer case (for example, an existing or upgraded transfer case) through a driveshaft. FIG. 9 is a schematic diagram of an electric vehicle conversion kit 900 for an IC vehicle (not shown) for providing power directly from a transfer case in accordance with another embodiment of the disclosure. FIG. 9 also depicts an example frame (or chassis) 902 for reference. The electric vehicle conversion kit 900 includes driveshafts 904 and 906, batteries 908, plate 910, and electric motor 912. As shown in FIG. 9 and discussed below, a transfer case 914 may provide power directly to the axles 916 and 918 of the vehicle via the driveshafts 904 and 906. It should be appreciated that the possible fasteners and other elements for attaching these components to different kinds of vehicles is intentionally omitted for clarity.

The transfer case 914 may be mounted to an existing cross member of a vehicle, the tray 910, the batteries 908, or a new cross member added to the vehicle. For example, the position of the transfer case 914 may be the same location as used for the ICE drivetrain of the vehicle, or the transfer case 914 may be moved to a new location.

The frame (or chassis) 902 may be representative of the frame or chassis of an IC vehicle. As will be appreciated, the frame (or chassis) 902 is a generalization of the look of common vehicle frames in the ¾ perspective view depicted in FIG. 9.

The electric motor 912 may drive the front axle 914 directly via the driveshaft 904. The electric motor 912 may drive the rear axle 916 directly via the driveshaft 906. The electric motor 912, driveshafts 904 and 906, and associated components may be usable across multiple vehicle platforms without extensive modification. For example, the modifications may be mounting points for the transfer case, length of axle shafts, gear ratios, and differences in position of one or both axles.

As shown in FIG. 9, in some embodiments the batteries 908 may be located in the between the frame rails (or chassis rails) 918. The batteries 908 may be secured via the tray 910. In some embodiments, the tray 910 may include or be attached to a skid plate. The location of the batteries 908 may contribute to chassis rigidity and provide for easier access for servicing. As will be appreciated, the batteries 908 shown in FIG. 1 are a generalized representation and not meant to indicate a specific number of batteries, preferred orientation, or shape. Moreover, embodiments having the batteries 908 may provide the engine compartment and gas tank area for storage. In some embodiments, additional batteries may be installed in the engine compartment, gas tank area, or both, for increased power, range, or combination thereof. Embodiments of the disclosure may include a battery cooling system to cool the batteries 908. Such systems may use various cooling technologies known in the art, such as air cooling, liquid cooling, fins, or other cooling technologies.

The electric vehicle conversion kit 900 may also include a tray 910. The tray 910 may be configured for secure attachment to the specific vehicle being converted. The tray 910 may serve the function of a skid plate for protection of the batteries 908, electric motor 912, and the transfer case 914 from debris or obstacles under the vehicle. In some embodiments, the tray 910 may provide a mounting point for the batteries 508, electric motor 912, the transfer case 914, or any combination thereof. In some embodiments, the tray 910 may provide an access panel to the power source (that is, batteries 908) and drive system (motor 912, driveshafts 904 and 906, and transfer case 914) of the vehicle. The tray 910 may be attached via bolts, screws, hinges, or other suitable fasteners or combination thereof. The tray 910 may be a single piece or may include multiple pieces. In some embodiments, the tray 910 may be generally rectangular-shaped. In other embodiments, the tray 910 may have a different shape. In some embodiments, the tray 910 may have a raised rim on one side, two sides, or more than two sides. For example, in such embodiments the raised rim may house fasteners or other components. In other embodiments, the tray 910 may not have a raised rim.

Figure 10A:
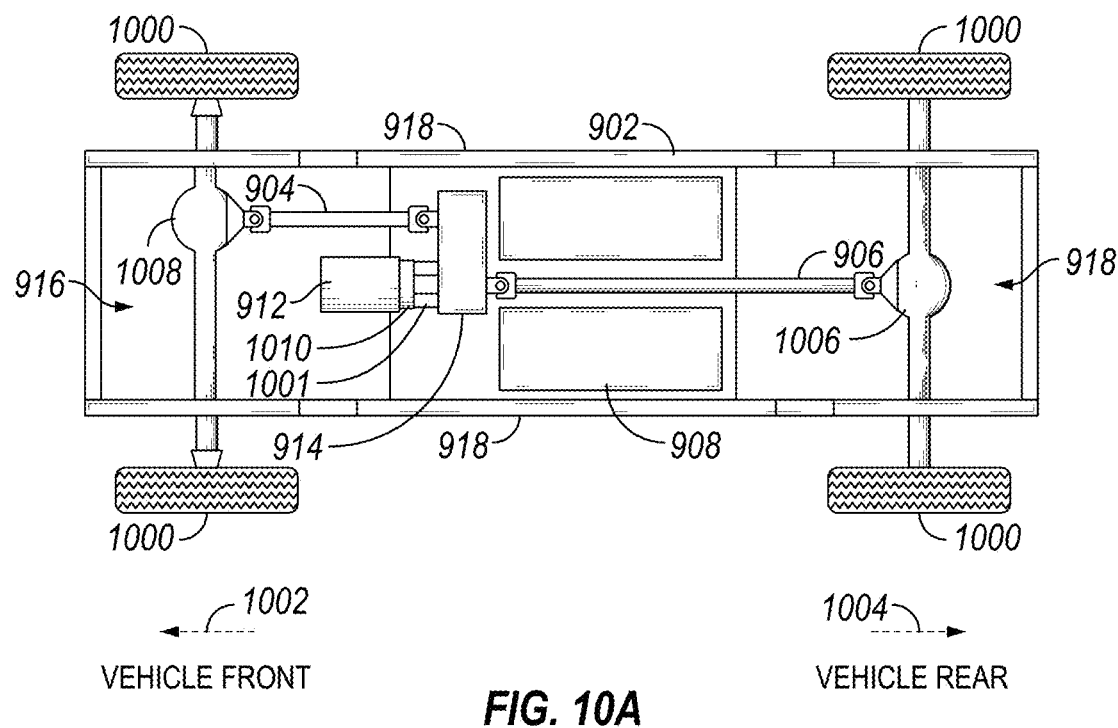
FIGS. 10A and 10B are schematic diagrams of the electric vehicle conversion kit of FIG. 9 in accordance with an embodiment of the disclosure.
Figure 10B:
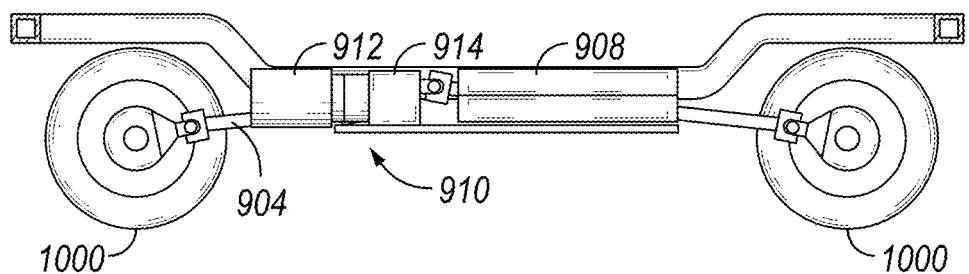

FIGS. 10A and 10B are a top schematic view and side schematic view respectively of the electric vehicle conversion kit 900 of FIG. 9 in accordance with an embodiment of the disclosure. FIGS. 10A and 10B depict the frame (or chassis) 902 and associated rails 918, and the tires 1000 of the vehicle. The tray 910 is shown in FIG. 10B. Arrow 1002 indicates the direction to the front of the vehicle, and arrow 1004 indicates the direction to the rear of the vehicle. As shown in FIGS. 10A and 10B, the electric vehicle conversion kit 900 may have a low profile and may be positioned for optimal weight distribution due to the position of the batteries 908, the electric motor 912, and the transfer case close to the center of the vehicle and lower to the ground (as compared to an ICE powertrain).

FIGS. 10A and 10B further illustrate the position of the batteries 908, the electric motor 912, and the transfer case 914 between the frame (or chassis) rails 918. FIGS. 10A and 10B also more clearly depict the accessibility of the batteries 908, electric motor 912, and transfer case 912 and the lowered center of gravity provided by the position of these components (as compared to an ICE mounted in an engine compartment and a transmission mounted in a transmission tunnel).

FIG. 10A also depicts transfer case mounting plate 1004, axle housings (or center differentials) 1006 and 1008, and an adapter plate 1010. The transfer case mounting plate 1004 may mount the transfer case 912 to the tray 910, existing cross-member, or another mounting point underneath a vehicle. In some embodiments, one, two, or more mounting plates 1004 may be used. The axle housings (or center differentials) 1006 and 1008 may be suitable components for a solid axle or an independent suspension configuration with CV shafts, or any other axle design which distributes power to two wheels from a central or offset axle. As will be appreciated, the shape of the transfer case mounting plate 1004 illustrated in FIG. 10A is merely one embodiment and other embodiments may have different shapes, sizes, or both. As shown in FIG. 10A, in some embodiments, the electric motor 912, the driveshafts 904 and 906, and the mounting plate 1004 may be mounted transversely with respect to the axles 916 and 918. In other embodiments, the electric motor 912, the driveshafts 904 and 906, and the mounting plate 1004 may be mounted in-line with respect to the axles 916 and 918. In some embodiments, the adapter plate 1010 may couple the electric motor 912 to the transfer case mounting plate 1004. In some embodiments, the adapter plate 1010 may include a shaft to mechanically couple the output drive shaft of the electric motor 912 to the input shaft of the transfer case 914.

Figure 11A:
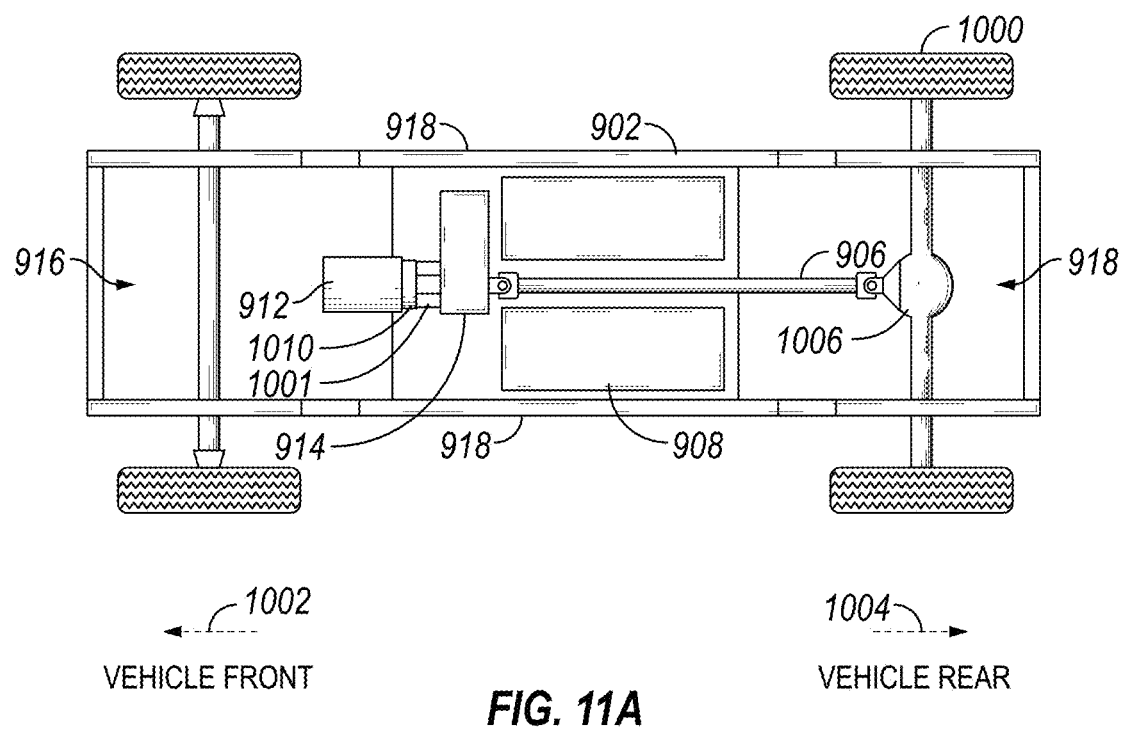
FIGS. 11A and 11B are schematic diagrams of the electric vehicle conversion kit of FIG. 9 in a rear wheel drive configuration in accordance with an embodiment of the disclosure.
Figure 11B:
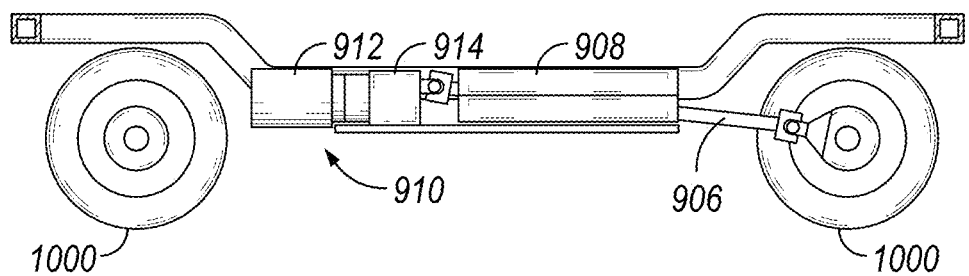

FIGS. 11A and 11B are a top schematic view and side schematic view respectively of an electric vehicle conversion kit 1100 (adapted from the kit 900) in a rear wheel drive configuration in accordance with another embodiment of the disclosure. FIGS. 11A and 11B depict a frame (or chassis) 1102 and associated rails 1104, and the tires 1000 of the vehicle. The kit 1100 may include the driveshaft 906, batteries 908, and electric motor 912. The transfer case 914 is also depicted. Arrow 1106 indicates the direction to the front of the vehicle, and arrow 1108 indicates the direction to the rear of the vehicle. As shown in FIGS. 11A and 11B, the electric vehicle conversion kit 1100 may have a low profile and may be positioned for optimal weight distribution.

FIGS. 11A and 11B further illustrate the position of the batteries 1108, electric motor 912, and transfer case 914 between the frame (or chassis) rails 1104. FIGS. 11A and 11B also more clearly depict the accessibility of the batteries 1108, electric motor 912, and transfer case 914 and the lowered center of gravity provided by the position of these components (as compared to an ICE mounted in an engine compartment and a transmission mounted in a transmission tunnel). The electric vehicle conversion kit 1100 further includes the transfer case mounting plate 1004 and an adapter plate 1010 that operate with the axle housings (or center differentials) 1006 and 1008 as previously described.

Figure 12A:
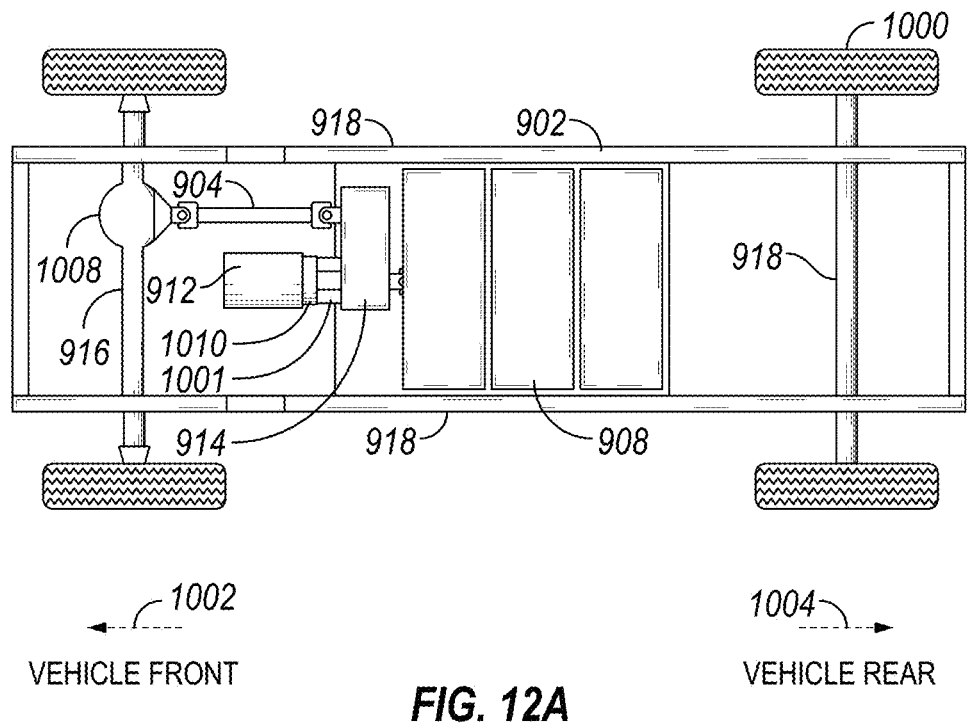
FIGS. 12A and 12B are schematic diagrams of the electric vehicle conversion kit of FIG. 9 in a front wheel drive configuration in accordance with an embodiment of the disclosure.
Figure 12B:
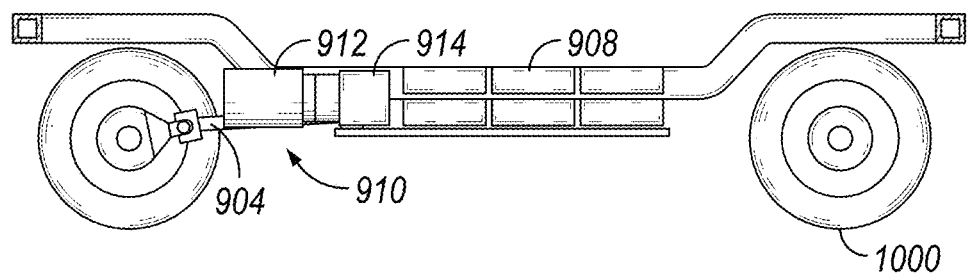

FIGS. 12A and 12B are a top schematic view and side schematic view respectively of an electric vehicle conversion kit 1200 (adapted from the kit 900) in a front wheel drive configuration in accordance with another embodiment of the disclosure. FIGS. 12A and 12B depict a frame (or chassis) 1202 and associated rails 1204, and the tires 1000 of the vehicle. The kit 1200 may include the driveshaft 904, batteries 908, and electric motor 912. The transfer case 914 is also depicted. Arrow 1206 indicates the direction to the front of the vehicle, and arrow 1208 indicates the direction to the rear of the vehicle. As shown in FIGS. 12A and 12B, the electric vehicle conversion kit 1200 may have a low profile and may be positioned for optimal weight distribution.

FIGS. 12A and 12B further illustrate the position of the batteries 908, electric motor 912, and transfer case 914 between the frame (or chassis) rails 1104. FIGS. 12A and 12B also more clearly depict the accessibility of the batteries 908, electric motor 912, and transfer case 914 and the lowered center of gravity provided by the position of these components (as compared to an ICE mounted in an engine compartment and a transmission mounted in a transmission tunnel). The electric vehicle conversion kit 1200 further includes the transfer case mounting plate 1004 and an adapter plate 1010 that operate with the axle housings (or center differentials) 1006 and 1008 as previously described.

Embodiments of the disclosure further include an electric vehicle having the components illustrated in FIGS. 9-12 and described above. It should be appreciated that in such embodiments the electric vehicle may include other components specific to the particular vehicle, such as a wiring harness, a computer, a power steering system (that may include a power steering adapter to adapt the power steering from hydraulic assist to electrical assist), a heating and air conditioning system (that may include a heating and air conditioning adapter to adapt the heating and air conditioning from mechanical drive to electric power), cabin controllers, switches, dials, and other hardware and software interface elements that enable control and monitoring of the vehicle, and electric components, fuses, relays, and connectors.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for converting an internal combustion engine (ICE) vehicle to an electric vehicle, comprising:
    coupling an electric motor directly to an axle of the vehicle, the electric motor adapted to power rotation of the axle;
    coupling an adapter plate to the electric motor and the axle;
    coupling an electric motor plate to the electric motor and the adapter plate, the electric motor plate positioned between the electric motor and a surface of the ground;
    coupling a tray to a frame of the vehicle and between the frame and the surface of the ground, the tray having a top side and a bottom side opposite the top side; and
    coupling a battery coupled to the top side of the tray, the battery configured to be electrically connected to the electric motor, wherein the battery is located between at least two frame rails of the frame.

2. The method of claim 1, wherein the axle comprises a front axle located at the front of the vehicle, the electric motor comprises a first electric motor, the adapter plate comprises a first adapter plate, and the electric motor plate comprises a first electric motor plate, the method comprising:
    coupling a second electric motor directly to a rear axle of the vehicle, the second electric motor adapted to power rotation of the rear axle, the rear axle located at the rear of the vehicle;
    coupling a second adapter plate to the second electric motor and the rear axle; and
    coupling a second electric motor plate to the second electric motor and the second adapter plate, the second electric motor plate positioned between the second electric motor and the surface of the ground.

3. The method of claim 1, wherein the tray comprises a moveable access panel.

4. The method of claim 1, wherein the coupling the adapter plate to the electric motor and the axle comprising coupling the adaptor plate via an axle housing or center differential.

5. The method of claim 1, wherein the adapter plate includes a reduction gear.

6. The method of claim 1, wherein the axle is a solid axle.

7. A method for converting an internal combustion engine (ICE) vehicle to an electric vehicle, comprising:
    coupling a tray to a frame of the vehicle and between the frame and the surface of the ground, the tray having a top side and a bottom side opposite the top side;
    coupling an electric motor to the top side of the tray via a coupling plate, the electric motor located between at least two frame rails of the frame and between a first axle and second axle of the vehicle;

coupling the electric motor to the first axle via a driveshaft, the electric motor configured to power rotation of the first axle; and coupling a battery to the top side of the tray, the battery configured to be electrically connected to the electric motor, wherein the battery is located between the at least two frame rails of the frame.

8. The method of claim 7, wherein the first axle comprises a front axle located at the front of the vehicle and the second axle comprises a rear axle located at the rear at the vehicle, the electric motor comprises a first electric motor, the driveshaft comprises a first driveshaft, and the coupling plate comprises a first coupling plate, the method comprising:

coupling a second electric motor to the top side of the tray via a second coupling plate;

coupling the second electric motor to the rear axle via second driveshaft, the second electric motor located between the at least two frame rails of the frame, wherein the second electric motor is configured to power rotation of the rear axle.

9. The method of claim 7, wherein the tray comprises a moveable access panel.

10. The method of claim 7, wherein the driveshaft is coupled to the first axle via an axle housing or center differential.

11. The method of claim 7, wherein the first axle is a solid axle.

12. A method for converting an internal combustion engine (ICE) vehicle to an electric vehicle, comprising:

coupling a tray to the frame of the vehicle and between the frame and the surface of the ground, the tray having a top side and a bottom side opposite the top side;

coupling an electric motor to a transfer case of the vehicle via an adapter plate and between at least two frame rails of the frame, the transfer case coupled to an axle of the vehicle via a driveshaft, wherein the electric motor is configured to power rotation of the axle of the vehicle; and coupling a battery to the top side of the tray and between the at least two frame rails of the frame, the battery configured to be electrically connected to the electric motor.

13. The method of claim 12, wherein the axle comprises a front axle located at the front of the vehicle and the driveshaft comprises a first driveshaft, comprising coupling the transfer case to a rear axle of the vehicle via a second driveshaft, wherein the electric motor is configured to power rotation of the rear axle of the vehicle.

14. The method of claim 12, wherein the tray comprises a moveable access panel.

15. The method of claim 12, wherein the driveshaft is coupled to the axle via an axle housing or center differential.

16. The method of claim 12, wherein the axle is a solid axle.

17. The method of claim 12, wherein the adapter plate couples an output shaft of the electric motor to an input shaft of the transfer case.

18. The method of claim 12, wherein the adapter plate comprises a shaft that couples the output shaft of the electric motor to the input shaft of the transfer case.

19. The method of claim 12, wherein the transfer case is coupled to the tray.

* * * * *